United States Patent [19]

Rhule et al.

[11] Patent Number: 5,671,945
[45] Date of Patent: Sep. 30, 1997

[54] AIR BAG ASSEMBLY WITH DIFFUSER

[75] Inventors: Daniel Allen Rhule, Miamisburg; Alex Scott Damman, Clayton; Vince Urban Otto, Dayton, all of Ohio

[73] Assignee: General Motors Corporation, Detroit, Mich.

[21] Appl. No.: 592,118

[22] Filed: Jan. 26, 1996

[51] Int. Cl.[6] .................................................. B60R 21/28
[52] U.S. Cl. ................................... 280/740; 280/728.2
[58] Field of Search .................................. 280/740, 728.2

[56] References Cited

U.S. PATENT DOCUMENTS

| | | | |
|---|---|---|---|
| 5,342,084 | 8/1994 | Rose et al. | 280/728.2 |
| 5,351,989 | 10/1994 | Popek et al. | 280/740 |
| 5,356,175 | 10/1994 | Rose et al. | 280/728.2 |
| 5,364,127 | 11/1994 | Cuevas | 280/740 |
| 5,456,489 | 10/1995 | Rose et al. | 280/728.2 |
| 5,468,012 | 11/1995 | Mihm | 280/728.2 |

*Primary Examiner*—Kenneth R. Rice
*Attorney, Agent, or Firm*—Kathryn A. Marra

[57] ABSTRACT

An air bag assembly includes an axially elongated inflator for generating gas. The inflator includes first and second ends and has a gas discharge opening located on the first inflator end. The air bag assembly also includes an air bag deployable upon generation of gas by the inflator. A diffuser cup engages the first inflator end on which the gas discharge opening is located. The diffuser cup diffuses the inflator gas into the air bag such that the inflator gas is spread more evenly into the air bag during air bag inflation. Preferably, the diffuser cup also retains the first inflator end to an end wall of a housing.

18 Claims, 6 Drawing Sheets

AIR BAG ASSEMBLY WITH DIFFUSER

This invention relates to a vehicle air bag assembly including a device for diffusing gas discharged by an inflator.

BACKGROUND OF THE INVENTION

It is well known in motor vehicles to provide an air bag assembly for protecting a vehicle occupant. It is also known to provide an air bag assembly including an air bag and an inflator for generating gas to inflate the air bag upon sensing predetermined vehicle conditions. The air bag assembly, especially on the passenger side, typically includes a housing having opposing end walls to which the respective ends of the inflator are mounted. Hybrid inflators are gaining increased popularity in the air bag industry. Current hybrid inflator designs have the gas discharge openings located at one end of the inflator. Since the inflator gas is discharged from only one end of the inflator, the air bag may be deployed unevenly so that one side inflates faster than the other. Thus, the discharging inflator gas from a hybrid inflator needs to be distributed more evenly into the inflating air bag for even, unbiased air bag inflation.

The prior art has addressed this problem by providing diffuser plates which are typically mounted across the axial length of the housing atop the inflator so that discharging inflator gas passes through openings in the diffuser plate to redistribute the discharging inflator gas more evenly into the inflating air bag. The addition of a diffuser plate adds time, cost and mass to the air bag assembly.

In addition to the increased popularity of hybrid inflators which discharge gas at one end, inflators are continually decreasing in size so that the length and diameter of the inflator no longer fits the original housing used in the production vehicle. It is sometimes desirable to use the newer, lighter inflator without changing the existing housing. The prior art has addressed this problem by providing a separate adapter or retainer used to help mount the end of the inflator to an existing inflator opening provided in the housing. However, these prior art adapters fail to provide any type of diffusion to permit the use of a hybrid inflator. Once again, these adapters or retainers add time, cost and mass to the air bag assembly.

In a typical hybrid inflator, the gas discharge ports are located together at one end of the inflator which usually has a reduced diameter compared to the remainder of the inflator. Since the gas is discharged very rapidly from only one end of the inflator, very high reaction loads are caused at the inflator end. The reduced diameter of one end of the inflator and the localized force of the discharging inflator gas makes retention of the hybrid inflator to the end walls of the housing very difficult. The prior art has attempted to mount the hybrid inflator to the housing with the use of a compression fit retainer attached to the end of the inflator with the gas discharging openings. However, this retainer device fails to provide any type of diffusion. Thus, a separate diffuser device, such as a diffuser plate described above, is also required adding time, mass and cost to the air bag assembly.

SUMMARY OF THE INVENTION

This invention solves the shortcomings of the prior art by providing an air bag assembly including a single device in a single location that can serve the dual purpose of both retaining the inflator end to the housing and also diffusing the inflator gas more evenly into the deploying air bag. This invention preferably provides a single component that serves these dual functions, thus enabling elimination of parts from the air bag assembly. In addition, the invention provides an improved compact and lightweight device for diffusing the inflator gas discharged at one end of the inflator without requiring a large and bulky separate plate-like structure as shown in the prior art. In addition, this retainer and diffuser device can also advantageously be handled as part of the inflator during assembly. The invention may also advantageously enable easy adaptation of hybrid inflators to existing air bag assemblies. Advantageously, the inflator gas is diffused without requiring a device that substantially reaches across the length of a housing of the air bag assembly.

These advantages are accomplished in a preferred form by providing an air bag assembly including an axially elongated inflator for generating gas. The inflator includes first and second ends and has a gas discharge opening located on the first end. The air bag assembly also includes an air bag deployable upon generation of gas by the inflator. The air bag assembly also includes a housing for supporting the first and second ends of the inflator. A retainer and diffuser device is used for retaining the first end of the inflator to the housing and for diffusing the inflator gas into the air bag such that the inflator gas is trapped and redistributed to spread more evenly into the air bag during air bag inflation. Preferably, the retainer and diffuser device has an axial length less than that of the inflator, is coaxially secured to the first end of the inflator, and is integrally made from a gas impervious material.

In another preferred form, the air bag assembly includes a diffuser cup engaging the first inflator end on which the gas discharge opening is located. The diffuser cup defines an axially opening trough portion that traps and redirects the inflator gas away from the first end of the inflator to diffuse the inflator gas more evenly into the deploying airbag. The trough portion preferably includes a generally axially extending wall portion and the wall portion is radially spaced apart from the gas discharge opening of the inflator. The gas discharge opening preferably has an outer axial end and an inner axial end and the trough portion terminates at an axial position proximate the inner axial end of the gas discharge opening of the inflator.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 4:
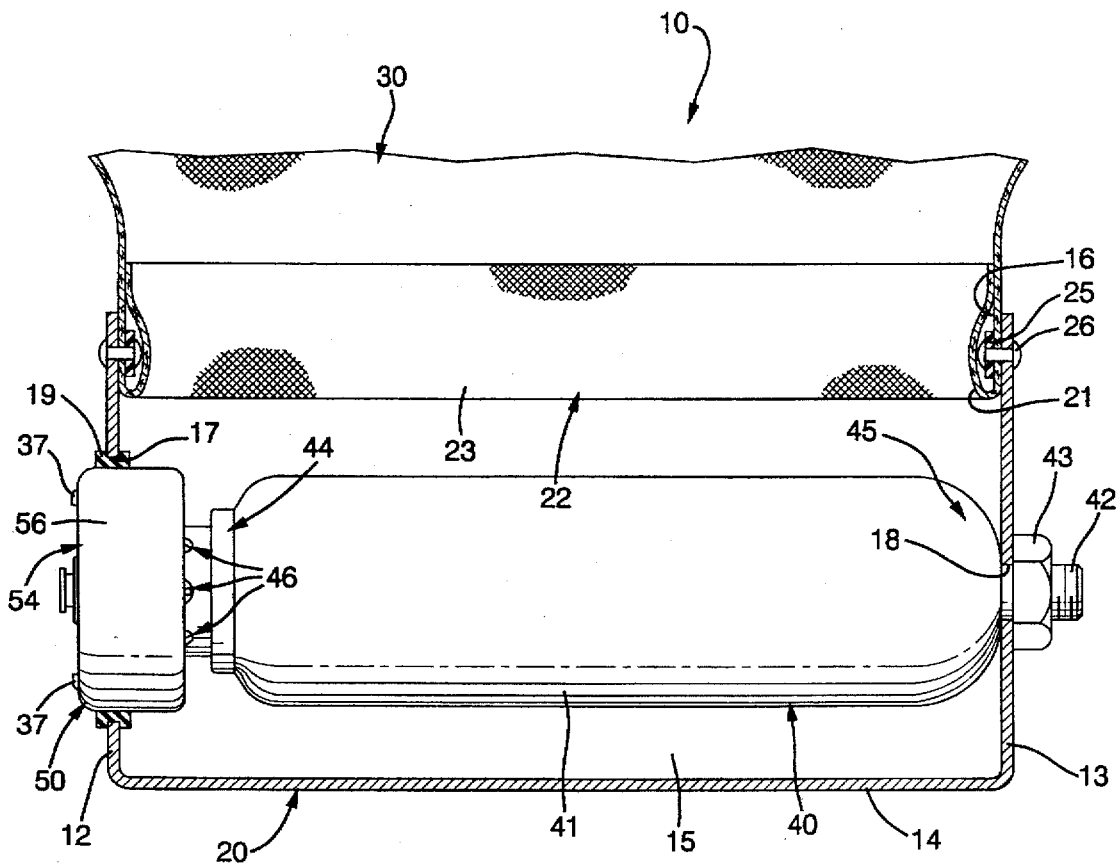
FIG. 4 is a side view of an air bag assembly including a sectional view of a housing and an air bag in the inflated condition.

Referring to FIG. 4, an air bag assembly 10 includes the component parts of a housing 20, an air bag 30 mounted to the housing 20, a hybrid inflator 40, and a diffuser cup 50, each described further hereinafter. The air bag assembly 10 is typically mounted beneath an opening in an instrument panel (not shown) for deployment upon the sensing of predetermined vehicle conditions.

The housing 20 is preferably a metal canister having axially spaced apart opposing first and second end walls 12, 13, a bottom wall 14, and side walls 15. The side walls 15 and end walls 12, 13 cooperatively define a housing opening 16 through which the air bag 30 deploys upon the generation of inflator gas as shown in FIG. 4. The first end wall 12 preferably includes an enlarged inflator opening 17 through which the entire inflator 40 may easily be inserted during assembly. The second end wall 13 preferably includes a smaller fastener aperture 18 through which an inflator fastener 42 can be inserted and secured such as by a nut 43, as described further hereinafter.

Referring to FIG. 4, the air bag 30 is generally of a conventional construction and is normally stored in a folded condition within the housing 20 atop the inflator 40. The air bag 30 includes a bag opening 21 surrounded by a mouth portion 22 including a peripheral hem portion 23 formed by appropriately folding and sewing the air bag material. An air bag retainer 25 is preferably positioned within the hem portion 23 of the air bag 30 for securely attaching the mouth portion 22 of the air bag 30 to the housing 20, such as by rivets 26. During air bag deployment, the air bag 30 unfolds and deploys out through the housing opening 16 and the instrument panel in a well-known manner.

The air bag assembly 10 also includes the inflator 40 for generating gas to inflate the air bag 30 upon receiving a predetermined signal from a vehicle sensor, not shown. The inflator 40 is an axially elongated cylinder having a first inflator end 44 and a second inflator end 45. The inflator 40 is preferably a typical hybrid construction wherein the inflator 40 has a main body portion 41 and the first inflator end 44 has a reduced diameter with gas discharge openings 46 circumferentially spaced around the first inflator end 44. The gas discharge openings 46 have an outer axial end 47 and an inner axial end 48. The inflator 40 extends axially across the housing 20 and the first and second inflator ends 44, 45 are supported by the first and second end walls 12, 13 of the housing 20, respectively, as described further hereinafter. The second inflator end 45 preferably includes the threaded inflator fastener 42 extending axially outward therefrom for extension through the fastener aperture 18 of the second end wall 13 of the housing 20 and securement to the second end wall 13 by the nut 43.

Figure 1:
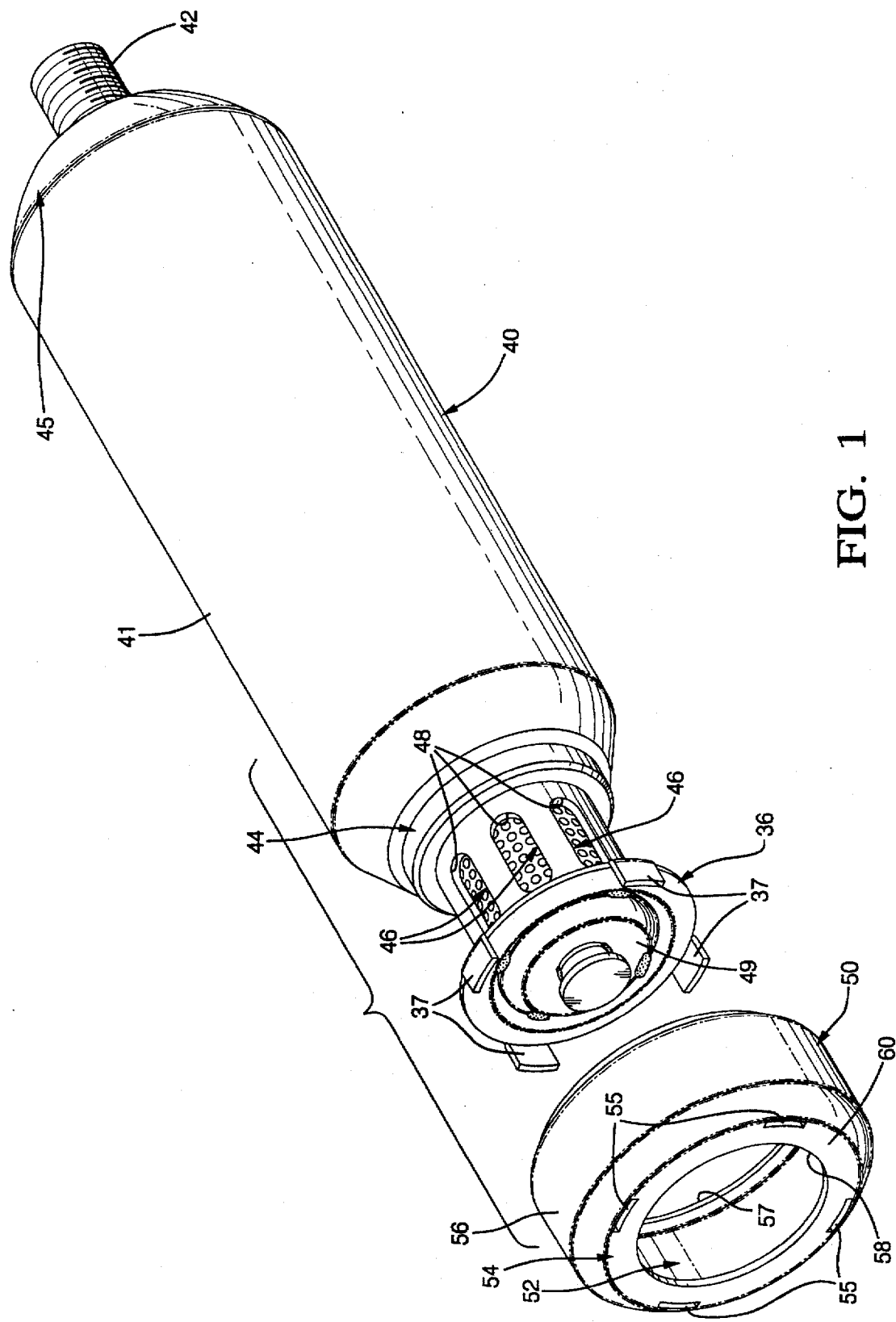
FIG. 1 is an exploded perspective view of an inflator and a diffuser cup.
Figure 2:
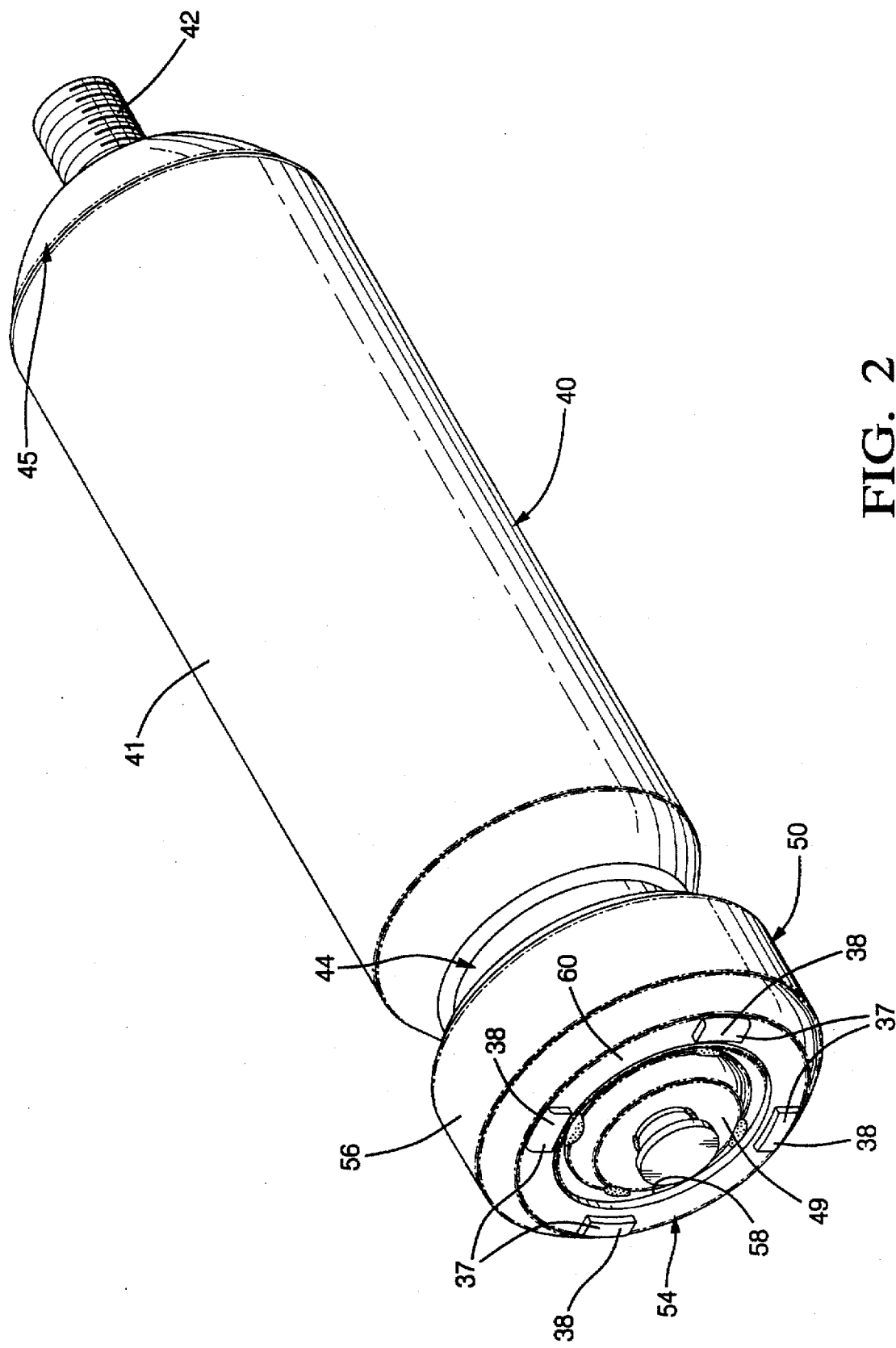
FIG. 2 is an assembled perspective view of the inflator and diffuser cup of FIG. 1.
Figure 3:
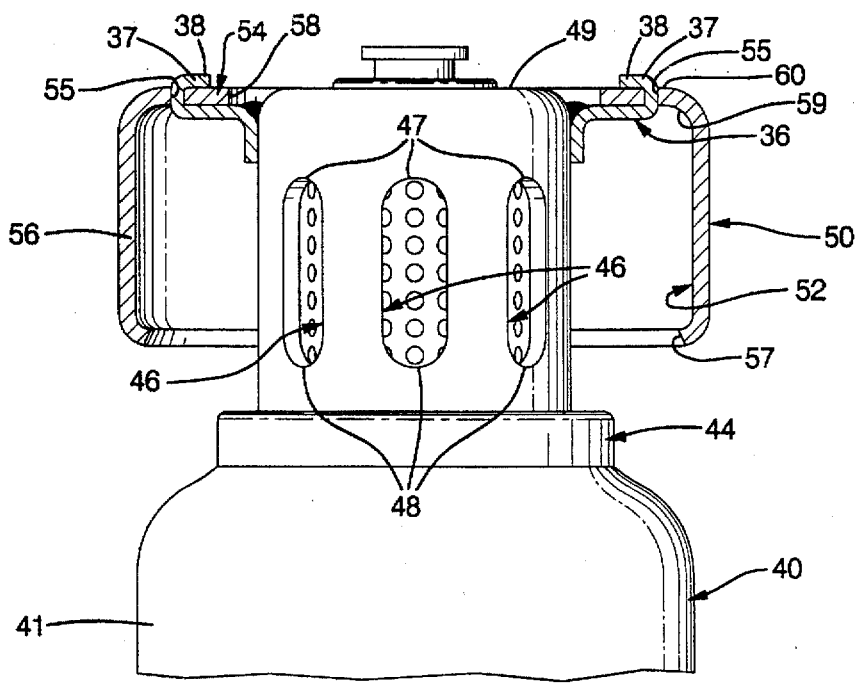
FIG. 3 is a side view of a first inflator end with a partial sectional view of the first inflator end and a sectional view of the diffuser cup.

As best shown in FIGS. 1 and 3, the first inflator end 44 may include a generally circular disk portion 36 which is preferably made from a metallic material. The disk portion 36 is preferably coaxially secured to the first inflator end 44 at a location axially outward of the gas discharge openings 46. The disk portion 36 extends radially outward from the first inflator end 44 and may be integral therewith or preferably is secured thereto, such as by welding as shown in FIG. 3. The disk portion 36 of the first inflator end 44 includes a plurality of tab portions 37 which serve as a first mating feature for securement of the first inflator end 44 to a second mating feature on the diffuser cup 50, as described below.

Referring to FIGS. 1–4, the diffuser cup 50 of the air bag assembly 10 preferably serves the dual purpose of both retaining the first inflator end 44 to the housing 20 and also of diffusing inflator gas into the air bag 30 such that the inflator gas is spread more evenly into the air bag 30 during inflation. The diffuser cup 50 is preferably integrally formed from a gas impervious material, such as metal. The diffuser cup 50 preferably has an outer diameter approximately equal to or slightly greater than an outer diameter of the main body portion 41 of the inflator 40. The diffuser cup 50 preferably has an overall length which is significantly less than an axial length of the inflator 40, preferably being less than a quarter of the overall axial length of the inflator 140.

The diffuser cup 50 defines an axially inwardly opening trough portion 52. The trough portion 52 preferably includes a generally radially extending engagement portion 54 and a generally axially extending wall portion 56 which is preferably a continuous extension of the engagement portion 54. However, it will be appreciated that the engagement portion 54 and the wall portion 56 may also be separate, as described below in an alternate embodiment. The wall portion 56 is radially spaced apart from the gas discharge openings 46 when the diffuser cup 50 is secured to the inflator 40. The wall portion 56 terminates in an axially inward diffuser opening 57 through which discharging inflator gas is expelled, as described further hereinafter. The engagement portion 54 includes the second mating feature preferably being a plurality of cup apertures 55 for engagement with the tab portions 37 of the first inflator end 44. The engagement portion 54 also includes a central opening 58 sized for closely receiving the first inflator end 44 therein, an inner surface 59 adjacent the gas discharge openings 46 and an opposite outer surface 60.

The diffuser cup 50 is preferably coaxially secured to the first inflator end 44 via interconnection of the first mating feature on the first inflator end 44 and the second mating feature on the engagement portion 54, as will now be described. More specifically, the engagement portion 54 of the diffuser cup 50 preferably includes the plurality of cup apertures 55 for receiving the tab portions 37 of the disk portion 36 therethrough as best shown in FIG. 1. Prior to attachment of the diffuser cup 50 to the first inflator end 44, the tab portions 37 are axially extending and aligned with respective cup apertures 55. The diffuser cup 50 can easily be slipped onto the first inflator end 44 by insertion of the tab portions 37 through the cup apertures 55 whereby an axially outermost tip 49 of the first inflator end 44 extends through the central opening 58 of the engagement portion 54. As best shown in FIG. 3, the tab portions 37 are bent over the outer surface 60 of the engagement portion 54 to form bent end portions 38 which secure the diffuser cup 50 to the first inflator end 44.

In the assembled condition shown in FIGS. 3 and 4, it will be appreciated that the engagement portion 54 of the diffuser cup 50 engages the first inflator end 44 at a position axially outward of the gas discharge openings 46 and then extends radially outward from the first inflator end 44. It will further be appreciated that when the diffuser cup 50 is assembled to the first inflator end 44, the wall portion 56 is radially spaced apart from the gas discharge openings 46 of the inflator 40 and preferably the wall portion 56 terminates at a location approximately adjacent to or slightly axially outward from the inner axial end 48 of the gas discharge openings 46.

The inflator 40 with the diffuser cup 50 secured thereto may advantageously be handled as a single component during assembly of the remainder of the air bag assembly 10. Referring to FIG. 4, the inflator 40 is secured and positioned within the housing 20 with the first inflator end 44 mounted on the first end wall 12 of the housing 20 and the second inflator end 45 mounted on the second end wall 13 of the housing 20. To accomplish this, the inflator 40 is axially aligned with the inflator opening 17 on the first end wall 12 of the housing 20. The inflator 40, with the second inflator end 45 leading, is axially inserted through the inflator opening 17 until the inflator fastener 42 on the second inflator end 45 is inserted through the fastener aperture 18 on the second end wall 13 of the housing 20 and secured thereto via a nut 43. Simultaneously, the diffuser cup 50 is seated within the inflator opening 17 of the first end wall 12 of the housing 20 such that the diffuser cup 50 extends partially through the inflator opening 17. It will be appreciated that the diffuser cup 50 tightly fills the inflator opening 17 to prevent the escape of discharging inflator gas out through the inflator opening 17. It will further be appreciated that the diffuser cup 50 mounts and retains the first inflator end 44 to the first end wall 12 of the housing 20 by a friction fit with the inflator opening 17. It will be appreciated that the diffuser cup 50 conveniently fills the inflator opening 17 which is sized larger than the first inflator end 44 whereby the main body portion 41 of the inflator 40 is easily axially inserted into the housing 20 during assembly. Advantageously, the inflator 40 may be the last component assembled to the air bag assembly 10. A gasket 19, preferably made of an elastomeric or polymeric material, may be placed around the inflator opening 17 to reduce vibration of the first inflator end 44 relative the first end wall 12 of the housing 20 and to ensure a secure friction fit between the diffuser cup 50 and the first end wall 12 of the housing 20.

Upon the sensing of predetermined vehicle conditions, the inflator 40 generates inflator gas which is discharged out through the gas discharge openings 46. The discharging inflator gas is strongly expelled in a direction radially outward from the gas discharge openings 46. The inflator gas is denied outward radial expansion by the surrounding wall portion 56 of the gas impervious diffuser cup 50. The axially inwardly opening trough portion 52 of the diffuser cup 50, including the engagement portion 54 and the wall portion 56, cooperatively trap and redirect the discharging inflator gas axially inward and out through the diffuser opening 57. Thus, the diffuser cup 50 distributes the inflator gas away from the first inflator end 44 and towards the second inflator end 45 to spread the inflator gas evenly into to the air bag 30 during inflation. Since the engagement portion 54 of the diffuser cup 50 radially overlaps the disk portion 36 of the first inflator end 44 as shown in FIG. 3, discharging inflator gas does not have an escape path between the connection of the diffuser cup 50 and the first inflator end Advantageously, testing has shown that the use of this simple, lightweight and compact diffuser cup 50 distributes the discharging inflator gas axially within the housing 20 such that the air bag 30 is inflated without being biased. In other words, the diffuser cup 50 ensures that the air bag 30 is evenly inflated such that the air bag 30 is not more quickly inflated near the first inflator end 44 than the second inflator end 45. Advantageously, the hybrid inflator 40 can be used without the need for a separate diffuser device which substantially expands across the entire housing. Advantageously, the inflator 40 and diffuser cup 50 secured thereto can be handled as a single component during assembly. Advantageously, the diffuser cup 50 also increases the diameter at the first inflator end 44 for retention within an existing inflator opening 17 on the housing 20. Also advantageously, the diffuser cup 50 provides a secure retainer device for the first inflator end 44 which cannot be directly mounted to the housing 20 due to the decreased diameter and localized gas discharge openings 46. Since the diffuser cup 50 traps and redistributes the discharging inflator gas within the housing 20, the diffuser cup 50 reduces the localized discharging gas loads near the first end wall 12 of the housing 20 and enables the first inflator end 44 to be easily mounted to the first end wall 12 of the housing 20 without concern about inflator 40 retention. Thus, the diffuser cup 50 can simply be friction fit into the housing 20 without additional manufacturing steps, such as welding of the diffuser cup 50 to the housing 20.

In addition, the diffuser cup 50 having a diameter greater than the diameter of the first inflator end 44 enables easy attachment of the first inflator end 44 to the inflator opening 17 of the housing 20. It will further be appreciated that the first inflator end 44 with the gas discharge openings 46 therein can be mounted coaxially within the inflator opening 17 of the housing 20 so that the inflator 40 does not need a separate retainer device which axially spaces the gas discharge openings 46 further away from the first end wall 12 of the housing 20. Advantageously, the diffuser cup 50 provides a single integral, compact, lightweight component that serves the dual purpose of retaining the first inflator end 44 to the housing 20 and diffusing the discharging inflator gas evenly into the air bag 30.

It will be understood that a person skilled in the art may make modifications to the preferred embodiment shown herein within the scope and intent of the claims. Although the preferred embodiment shows the air bag 30 preferably mounted to the housing 20, it will also be appreciated that the air bag 30 could be attached to the inflator 40 with the inflator 40 and diffuser cup 50 contained substantially within the air bag 30 to enable more compact folding of the air bag 30 within the housing 20. This advantage is not possible with prior art diffusers. Although a plurality of gas discharge openings 46 are shown, fewer or more gas discharge openings 46 than shown are possible. It will further be appreciated that the axial length of the diffuser cup 50 may be varied, but the diffuser cup 50 preferably ends approximately at or slightly axially outward from the inner axial end 48 of the gas discharge openings 46 for preferred diffusion of inflator gas into the air bag 30.

While the diffuser cup 50 may advantageously be used to retain the first inflator end 44 to the housing 20, it will be appreciated that the diffuser cup 50 need not be used to retain the first inflator end 44 and instead can be used only for diffusing the discharging inflator gas while the first inflator end 44 is attached to the housing 20 in another manner such as by a fastener and nut arrangement. Although the diffuser cup 50 is shown as having a circular configuration, it will be appreciated that the diffuser cup 50 may have other geometric configurations which preferably complement the shape of the inflator opening 17 on the first end wall 12 of the housing 20.

Although the diffuser cup 50 is shown as a separate component which is joined to the first inflator end 44, it will be appreciated that the diffuser cup 50 could be integrally formed on the first inflator end 44. Although the diffuser cup 50 is shown preferably secured to the first inflator end 44 by the interconnection of first and second mating features being tab portions 37 on the disk portion 36 of the first inflator end 44 and cup apertures 55 on the diffuser cup 50, it will be appreciated that the diffuser cup 50 may be secured to the first inflator end 44 in any suitable manner. In addition, the disk portion 36 could be integrally formed with the inflator 40. It will also be appreciated that the disk portion 36 secured to the first inflator end 44 may be eliminated and the diffuser cup 50 may be directly secured to the first inflator end 44.

Figure 5:
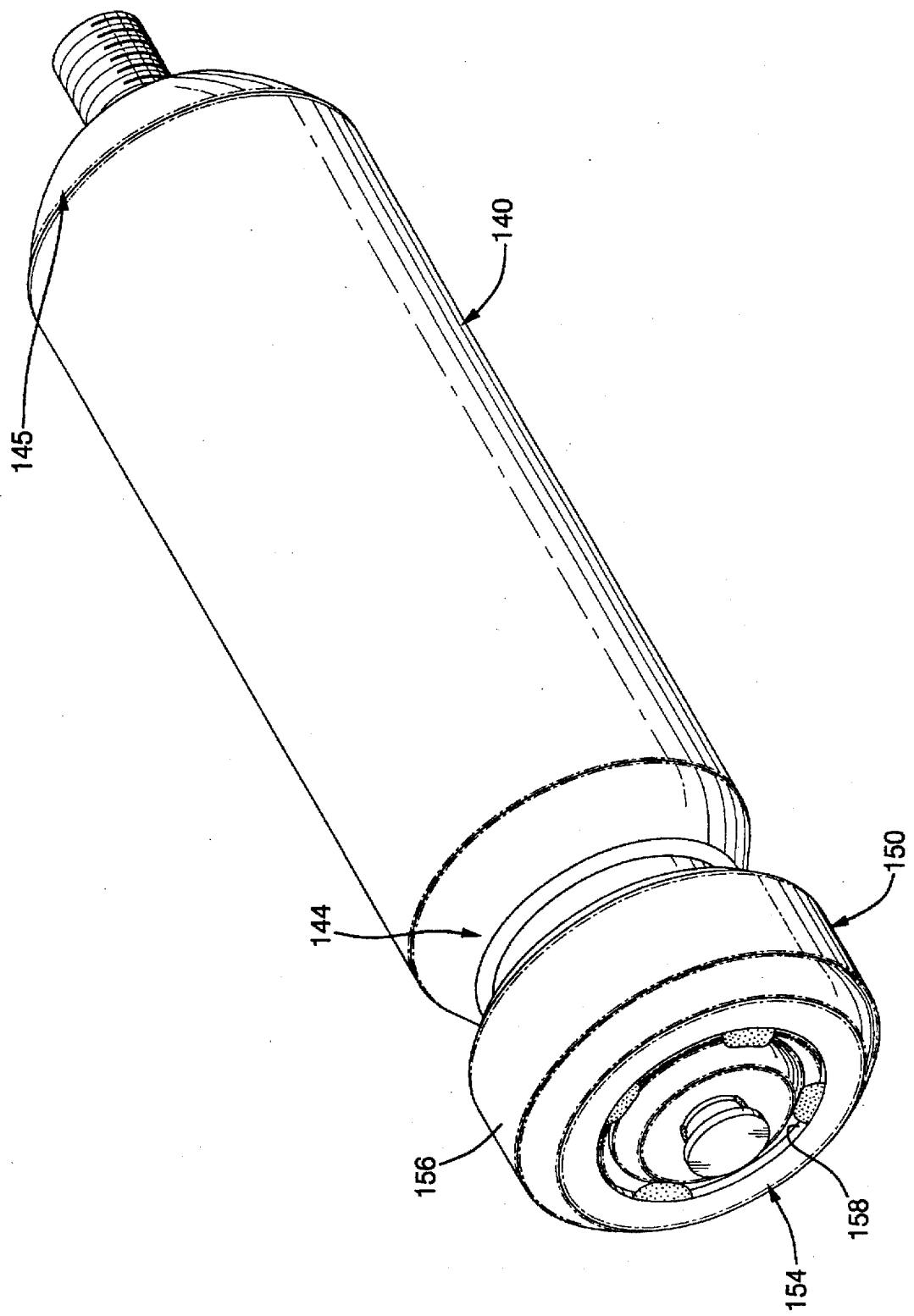
FIG. 5 is a perspective view similar to FIG. 2, but showing an alternate embodiment.
Figure 6:
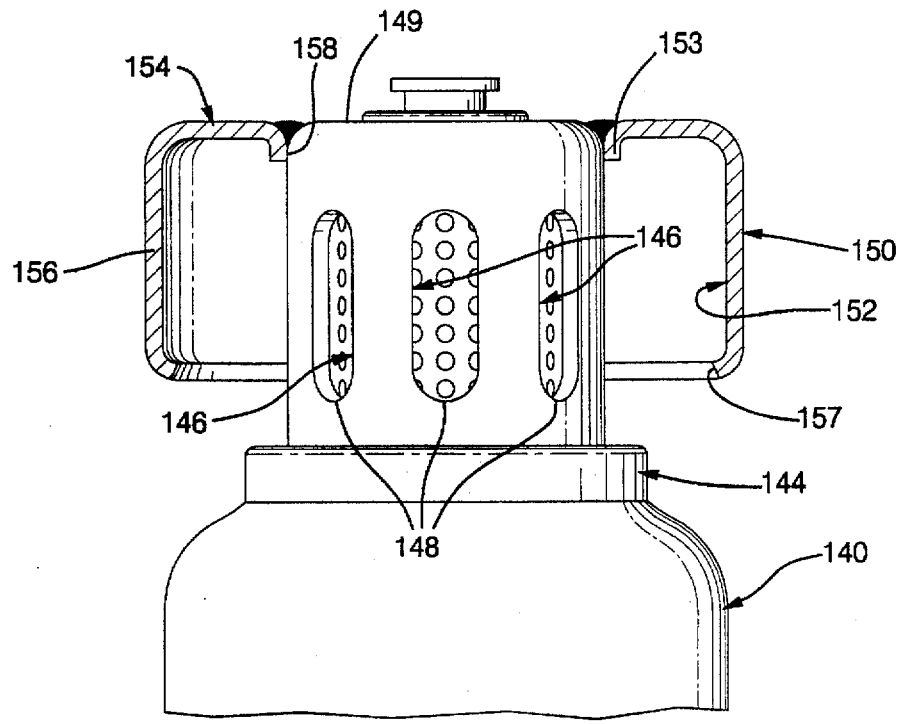
FIG. 6 is a view similar to FIG. 3, but showing the alternate embodiment of FIG. 5.

For example, FIGS. 5 and 6 show an alternate embodiment similar to the embodiment shown in FIGS. 1-4, except that a diffuser cup 150 is directly secured to an inflator 140. The inflator 140 has a first inflator end 144 and a second inflator end 145. The diffuser cup 150 includes an axially inwardly opening trough portion 152 including a radially outwardly extending engagement portion 154 and an axially extending wall portion 156. The engagement portion 154 includes a central opening 158 sized for closely receiving the first inflator end 144 therein. As best shown in FIG. 6, a rim 153 of the central opening 158 of the engagement portion 154 is simply welded to the first inflator end 144 at a location axially outward from gas discharge openings 146 on the first inflator end 144 to securely connect the diffuser cup 150 to the inflator 140.

In the assembled condition, the wall portion 156 is radially spaced apart from the gas discharge openings 146 of the inflator 140 and the wall portion 156 preferably terminates in a diffuser opening 157 at an axial location proximate an inner axial end 148 of the gas discharge openings 146. Upon the generation of gas by the inflator 140, the axially inwardly opening trough portion 152 of the diffuser cup 150 traps and redirects the discharging inflator gas axially inward and out through the diffuser opening 157. Thus, the diffuser cup 150 redistributes the inflator gas away from the first inflator end 144 and towards the second inflator end 145 to distribute the inflator gas evenly into an air bag during inflation. A tight fit between the rim 153 of the engagement portion 154 and an outermost tip 149 of the first inflator end 144 ensures that a significant amount of inflator gas does not escape between the diffuser cup 150 and the first inflator end 144. The inflator 140 with the diffuser cup 150 secured thereto is retained to a housing in a manner similar to the embodiment described for FIGS. 1-4.

Figure 7:
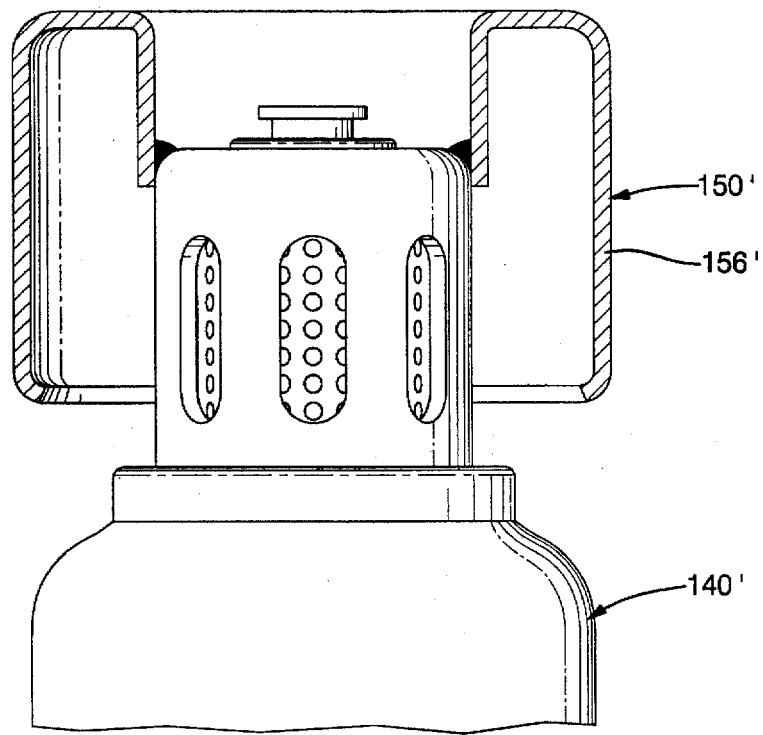
FIG. 7 is a view similar to FIG. 6, but showing yet another alternate embodiment.

FIG. 7 shows yet another alternate embodiment having a description similar to the embodiment shown in FIGS. 5 and 6, except that an axial length of a wall portion 156' of a diffuser cup 150' is increased so that a shorter hybrid inflator 140' can be adapted to mount in an existing housing having an axial length longer than that of the inflator 140'.

Figure 8:
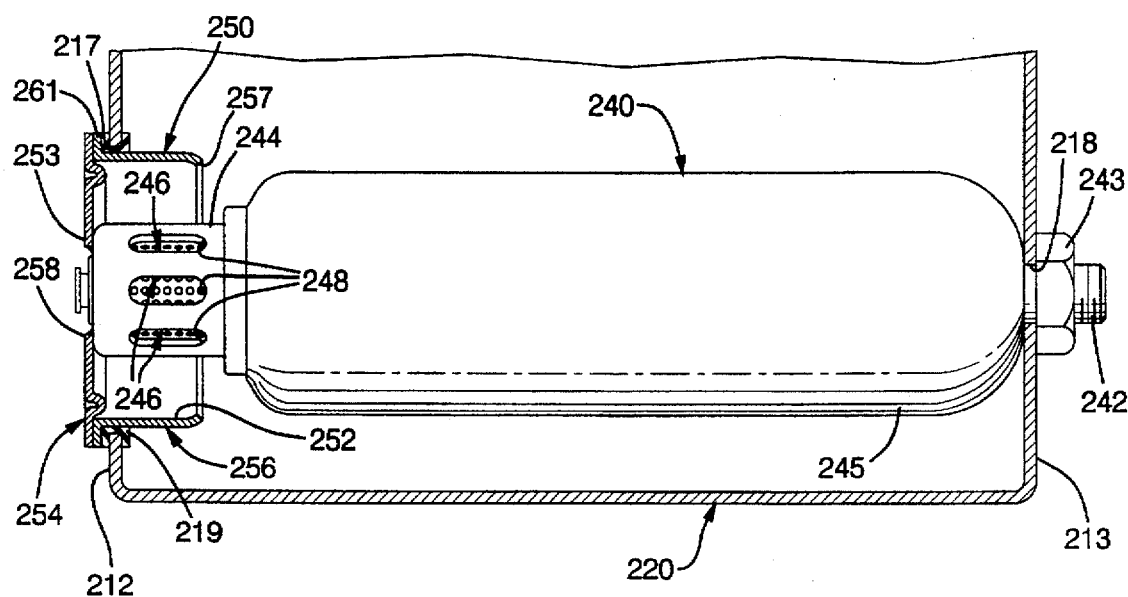
FIG. 8 is a side view of an air bag assembly including a sectional view of a housing and a diffuser cup according to a third alternate embodiment.

FIG. 8 shows a third alternate embodiment in which the engagement portion 254 and the wall portion 256 of the diffuser cup 250 are each separate components which may provide inflator 240 handling advantages. The inflator 240 has a first inflator end 244 and a second inflator end 245. The diffuser cup 250 includes an axially inwardly opening trough portion 252 formed by the radially outwardly extending engagement portion 254 and the axially extending wall portion 256. The engagement portion 254 is a generally planar plate and includes a central opening 258. The engagement portion 254 may include a positioning feature such as dimples. The wall portion 256 is preferably a circular shape and includes a radially outwardly projecting lip portion 261 on its outer axial end which locates and seats the diffuser cup 250, as described further hereinafter. As shown in FIG. 8, a rim 253 of the central opening 258 of the engagement portion 254 is simply welded to the first inflator end 244 at a location axially outward from gas discharge openings 246 to securely connect the engagement portion 254 to the inflator 240.

The housing 220 is preferably a metal canister having axially spaced apart opposing first and second end walls 212, 213. The first end wall 212 preferably includes an enlarged inflator opening 217 through which the entire inflator 240 may easily be inserted during assembly. However, it will be appreciated that the engagement portion 254, preferably attached to the inflator 240 prior to insertion into the housing 220, is sized larger than the inflator opening 217 so that the engagement portion 254 abuts against an outer surface of the first end wall 212 of the housing 220. The second end wall 213 preferably includes a smaller fastener aperture 218 through which an inflator fastener 242 can be inserted and secured, such as by a nut 243.

During assembly, the wall portion 256 of the diffuser cup 250 is preferably pushed axially inward into the inflator opening 217 of the housing 220 until the lip portion 261 is securely seated against a gasket 219. The lip portion 261, sized larger than the inflator opening 217, limits axial insertion of the wall portion 256 into the housing 220. Next, the inflator 240, with the second inflator end 245 leading is inserted through the inflator opening 217 and the wall portion 256 of the diffuser cup 250 until the engagement portion 254 engages the lip portion 261 of the wall portion 256 to limit further axial insertion. Simultaneously, the inflator fastener 242 is axially inserted through the fastener aperture 218 on the second end wall 213 of the housing 220 and secured thereto, such as by a nut 243. It will be appreciated that securement of the second inflator end 245 to the second end wall 213 of the housing 220 positions the inflator 240 and securely traps the lip portion 261 of the diffuser cup 250 between the engagement portion 254 and the housing 220. Also, the engagement portion 254 of the diffuser cup 250 clamps down on the lip portion 261 of the wall portion 256 of the diffuser cup 250 to cooperatively define the trough portion 252 of the diffuser cup 250. It may be advantageous to have the wall portion 256 separate from the engagement portion 254 so that the wall portion 256 of the diffuser cup 250 does not direct inflator gas during an inadvertent discharge during handling and assembly.

In the assembled condition, the wall portion 256 is radially spaced apart from the gas discharge openings 246 of the inflator 240 and the wall portion 256 preferably terminates in a diffuser opening 257 at an axial location proximate an inner axial end 248 of the gas discharge openings 246. Upon the generation of gas by the inflator 240, the axially inwardly opening trough portion 252 of the diffuser cup 250 traps and redirects the discharging inflator gas axially inward and out through the diffuser opening 257 to more evenly inflate an air bag (not shown in FIG. 8) also stored in the housing 220.

Figure 9:
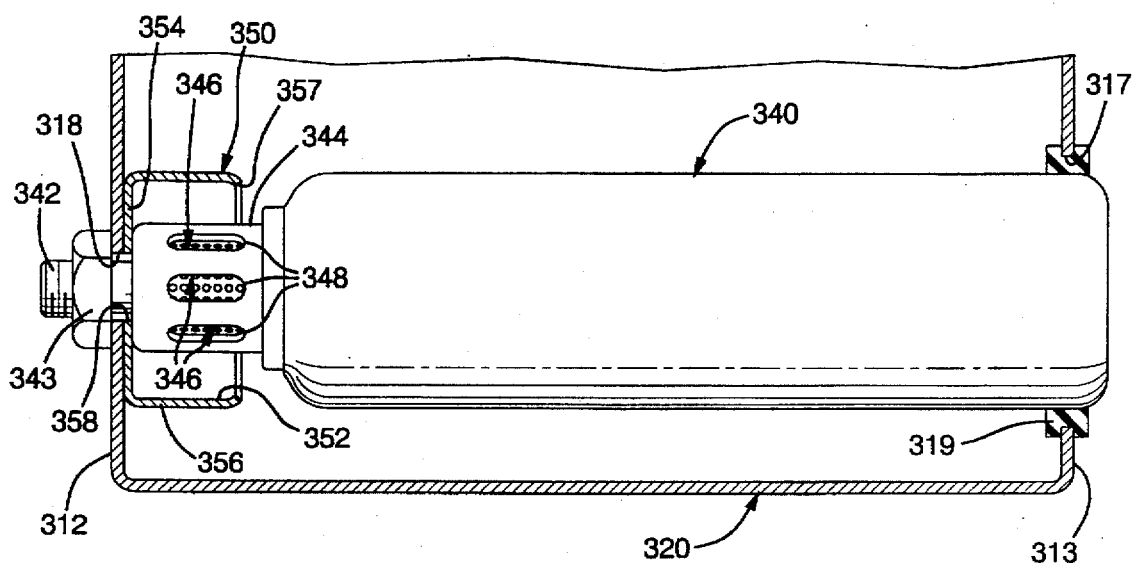
FIG. 9 is a view similar to FIG. 8, but showing a fourth alternate embodiment.

FIG. 9 shows a fourth alternate embodiment in which a diffuser cup 350 does not assist in retaining an inflator 340 to a housing 320. This fourth embodiment may also have some inflator 340 handling and assembly advantages. The inflator 340 has a first inflator end 344 including gas discharge openings 346 and a larger second inflator end 345. The diffuser cup 350 is preferably a single component including an axially inwardly opening trough portion 352 formed by a radially outwardly extending engagement portion 354 and an axially extending wall portion 356. The engagement portion 354 includes a central opening 358 sized for receiving an inflator fastener 342 therethrough.

The housing 320 is preferably a metal canister having axially spaced apart opposing first and second end walls 312, 313. The second end wall 313 preferably includes an enlarged inflator opening 317 through which the entire inflator 340 and diffuser 350 may easily be inserted during assembly. The first end wall 312 preferably includes a smaller fastener aperture 318 through which the inflator fastener 342 can be inserted and secured, such as by a nut 343.

During assembly, the inflator fastener 342 is axially inserted through the central opening 358 of the engagement portion 354 such that the entire diffuser cup 350 is loosely connected to the first inflator end 344. Next, the inflator 340, with the first inflator end 344 leading, is axially inserted through the inflator opening 317 on the second end wall 313 of the housing 320. The diffuser cup 350 is simultaneously inserted with the inflator 340 into the housing 320 as permitted by the diffuser cup 350 being sized for closely fitting through the inflator opening 317. Upon full insertion, the second inflator end 345 is securely captured and seated within a gasket 319 in the inflator opening 317 of the second end wall 313 of the housing 320 and the inflator fastener 342 is axially inserted through the fastener aperture 318 on the first end wall 312 of the housing 320 and secured thereto, such as by the nut 343. It will be appreciated that securement of the first inflator end 344 to the first end wall 312 of the housing 320 also securely traps the engagement portion 354 of the diffuser cup 350 between the first end wall 312 of the housing 320 and the first inflator end 344 to securely hold the diffuser cup 350 in position. It may be advantageous to have the diffuser cup 350 separate from the inflator 340 until final assembly to the housing 320 so that the diffuser cup 350 does not direct inflator gas during an inadvertent discharge during handling of the inflator 340.

In the assembled condition, the diffuser cup 350 diffuses inflator gas similar to the other embodiments but does not need to be used to retain either of the inflator ends 344, 345 to the housing 320. The wall portion 356 is radially spaced apart from the gas discharge openings 346 of the inflator 340 and the wall portion 356 preferably terminates in a diffuser opening 357 at an axial location proximate an inner axial end 348 of the gas discharge openings 346. Upon the generation of gas by the inflator 340, the axially inwardly opening trough portion 352 of the diffuser cup 350 traps and redirects the discharging inflator gas axially inward and out through the diffuser opening 357 to more evenly inflate an air bag (not shown in FIG. 9) also stored in the housing 320.

While the present invention has been described as carried out in a specific embodiment thereof, it is not intended to be limited thereby but is intended to cover the invention broadly within the scope and spirit of the claims.

We claim:

1. An air bag assembly comprising:
   an axially elongated inflator for generating gas, the inflator having first and second ends and having a gas discharge opening located on the first end;
   an air bag deployable upon generation of gas by the inflator;
   a housing for supporting the first and second ends of the inflator;
   a retainer and diffuser means for retaining the first end of the inflator to the housing and for diffusing the inflator gas directly into the air bag such that the inflator gas is spread more evenly into the air bag during air bag inflation; and
   the inflator having an axial length and the retainer and diffuser means having an axial length less than one half the axial length of the inflator.

2. The air bag assembly of claim 1 wherein the retainer and diffuser means has an axial length less than one quarter the axial length of the inflator.

3. The air bag assembly of claim 1 wherein the retainer and diffuser means is coaxially secured to the first end of the inflator.

4. The air bag assembly of claim 1 wherein the retainer and diffuser means defines an axially opening trough portion that traps and redirects the inflator gas away from the first end of the inflator to diffuse the inflator gas more evenly into the deploying airbag.

5. The air bag assembly of claim 1 wherein the trough portion includes a generally axially extending wall portion, the wall portion being radially spaced apart from the gas discharge opening of the inflator.

6. An air bag assembly comprising:
   an axially elongated inflator for generating gas, the inflator having first and second inflator ends and having a gas discharge opening located on the first inflator end;
   an air bag deployable upon generation of gas by the inflator;
   a diffuser cup engaging the first inflator end, the diffuser cup for diffusing the inflator gas directly into the air bag such that the inflator gas is spread more evenly into the air bag during inflation, the diffuser cup including an axially opening trough portion that directs the inflator gas away from the first end of the inflator to diffuse the inflator gas directly and more evenly into the deploying air bag; and
   the gas discharge opening having an outer axial end and an inner axial end and the trough portion terminating at an axial position proximate the inner axial end of the gas discharge opening of the inflator.

7. The air bag assembly of claim 6 wherein the diffuser cup is coaxial with the first inflator end.

8. The air bag assembly of claim 6 wherein the diffuser cup includes a generally axially extending wall portion, the wall portion being radially spaced apart from the gas discharge opening of the inflator.

9. The air bag assembly of claim 8 wherein the diffuser cup includes a substantially radially extending engagement portion engaging the first inflator end.

10. The air bag assembly of claim 9 wherein the wall portion is a continuous extension of the engagement portion.

11. An air bag assembly comprising:
    an axially elongated inflator for generating gas, the inflator having first and second inflator ends and having a gas discharge opening located on the first inflator end;
    an air bag deployable upon generation of gas by the inflator;
    a diffuser cup engaging the first inflator end, the diffuser cup for diffusing the inflator gas directly into the air bag such that the inflator gas is spread more evenly into the air bag during inflation; and
    the diffuser cup including a generally axially extending wall portion, the wall portion being radially spaced apart from the gas discharge opening of the inflator, and the diffuser cup including a substantially radially extending engagement portion engaging the first inflator end, and the wall portion and the engagement portion being independent components.

12. An air bag assembly comprising:
    an axially elongated inflator for generating gas, the inflator having first and second inflator ends and having a gas discharge opening located on the first inflator end;
    an air bag deployable upon generation of gas by the inflator;
    a diffuser cup engaging the first inflator end, the diffuser cup for diffusing the inflator gas directly into the air bag such that the inflator gas is spread more evenly into the air bag during inflation; and
    a housing having opposing end walls and wherein securement of the second inflator end to one of the end walls traps and positions the diffuser cup between the first inflator end and the other of the end walls.

13. An air bag assembly comprising:

an axially elongated inflator for generating gas, the inflator having first and second inflator ends and having a gas discharge opening located on the first inflator end;

an air bag deployable upon generation of gas by the inflator;

a diffuser cup engaging the first inflator end, the diffuser cup for diffusing the inflator gas directly into the air bag such that the inflator gas is spread more evenly into the air bag during inflation; and a housing having opposing end walls and the diffuser cup retaining the first inflator end to one of the end walls.

14. The air bag assembly of claim 13 wherein the diffuser cup includes a first mating feature and wherein the first inflator end includes a second mating feature and wherein the first and second mating features are engaged to secure the diffuser cup to the inflator wherein the first mating feature includes a plurality of apertures and the second mating feature includes a plurality of tabs.

15. The air bag assembly of claim 13 wherein the diffuser cup includes a first mating feature and wherein the first inflator end includes a second mating feature and wherein the first inflator end includes a radially extending disk portion and wherein the plurality of tabs extend from the disc portion.

16. The air bag assembly of claim 13 wherein the inflator has an axial length and wherein the diffuser cup has an axial length less than half that of the inflator.

17. An air bag assembly comprising:

an axially elongated inflator for generating gas, the inflator having first and second inflator ends and having a gas discharge opening located on the first inflator end;

an air bag deployable upon generation of gas by the inflator;

a diffuser cup engaging the first inflator end, the diffuser cup for diffusing the inflator gas directly into the air bag such that the inflator gas is spread more evenly into the air bag during inflation; and a housing having an end wall including an inflator opening and the diffuser cup positioning the first inflator end relative to the end wall and filling the inflator opening to prevent the escape of discharging inflator gas out through the inflator opening.

18. An air bag assembly comprising:

a housing having spaced apart opposing first and second end walls, the first end wall having an inflator opening;

an axially elongated inflator for generating gas, the inflator having a first inflator end and a second inflator end, the inflator having a gas discharge opening located on the first inflator end;

an air bag deployable upon generation of gas by the inflator; and a diffuser and retainer cup secured to the first inflator end and engaging the inflator opening to retain the first inflator end to the housing, the diffuser cup defining an axially opening trough portion that traps and redirects the discharging inflator gas away from the first inflator end to diffuse the inflator gas such that the inflator gas is spread more evenly into the deploying air bag.

* * * * *